(12) United States Patent
Cohen

(10) Patent No.: US 7,047,564 B2
(45) Date of Patent: *May 16, 2006

(54) REVERSE FIREWALL PACKET TRANSMISSION CONTROL SYSTEM

(75) Inventor: Donald M. Cohen, Los Angeles, CA (US)

(73) Assignee: Computing Services Support Solutions, Inc., Los Angeles, CA (US)

(*) Notice: Subject to any disclaimer, the term of this patent is extended or adjusted under 35 U.S.C. 154(b) by 899 days.

This patent is subject to a terminal disclaimer.

(21) Appl. No.: 10/001,349

(22) Filed: Oct. 31, 2001

(65) Prior Publication Data

US 2003/0084317 A1 May 1, 2003

(51) Int. Cl.
*G06F 11/30* (2006.01)
*G06F 15/16* (2006.01)
(52) U.S. Cl. .................... 726/23; 726/13; 709/233
(58) Field of Classification Search ............. 713/200, 713/201; 709/223, 224, 230, 232, 233; 370/229, 370/230, 235
See application file for complete search history.

(56) References Cited

U.S. PATENT DOCUMENTS

| | | | |
|---|---|---|---|
| 6,643,256 B1* | 11/2003 | Shimojo et al. | 370/229 |
| 6,725,378 B1* | 4/2004 | Schuba et al. | 713/201 |
| 6,789,190 B1* | 9/2004 | Cohen | 713/160 |
| 2002/0138643 A1* | 9/2002 | Shin et al. | 709/232 |
| 2004/0264371 A1* | 12/2004 | Chen | 370/229 |

OTHER PUBLICATIONS

Plonka, "FlowScan: A Network Traffic Flow Reporting and Visualization Tool", Dec. 2000, 2000 LISA XIV, p. 305-317.*
Barford et al, "Characteristics of Network Traffic Flow Anomalies", Nov. 2001, ACM, p. 69-73.*
Brownlee, "Traffic Flow Measurement: Architecture", Jan. 1997, RFC 2063, p. 1-37.*

* cited by examiner

*Primary Examiner*—Christopher Revak
(74) *Attorney, Agent, or Firm*—David A. Belasco; Belasco Jacobs & Townsley, LLP

(57) ABSTRACT

The invention is designed to eliminate or minimize the liability associated with "packet flooding" attacks originating from within a local area network connected to an external network such as one controlled by a university or governmental organization. In these attacks, an attacker uses up all available bandwidth to a victim with useless data. The invention performs its function by identifying and classifying data packets arriving at a "Reverse Firewall" for transmission to the external network using various techniques. For example, data packets that are sent in response to data packets received from the external network will receive a different classification and thus allocation of resources than data packets not sent in response to previously received packets. The invention also serves to maximize use of data packet handling resources within the local area network by identifying those data packets that are requests for service, measuring the amount of service required by those packets, storing and recalling past service measurements and thus determining an appropriate allocation of resources.

6 Claims, 6 Drawing Sheets

REVERSE FIREWALL PACKET TRANSMISSION CONTROL SYSTEM

This invention was made with Government support under Contract # DAAH01-00-C-R211 awarded by U.S. Army Aviation and Missile Command. The Government has certain rights in the invention.

FIELD OF INVENTION

The invention pertains to network data transmission controls. More particularly, the invention relates to systems for minimizing the effects of Distributed Denial of Service (DDOS) attacks emanating from inside of a local area network.

BACKGROUND OF THE INVENTION

Various types of systems have been developed for handling unwanted network data transmission incorporating a number of different technologies. U.S. Pat. No. 6,304,975 issued to Shipley discloses an intelligent network security device ("INSD") that operates in a local area network ("LAN") according to an intelligent network security method. The LAN has a plurality of computers and connects to the Internet through a firewall. The INSD resides within the LAN such that data traversing between the LAN and the Internet is accessible thereto. The INSD looks for code and patterns of behavior and assigns a value to perceived attempted security breaches. The INSD then directs the firewall to take any of a prescribed plurality of actions, based upon such value.

U.S. Pat. No. 6,154,775 issued to Coss, et al., describes a system, which provides improved computer network firewalls that include one or more features for increased processing efficiency. A firewall in accordance with the invention can support multiple security policies, multiple users or both, by applying any one of several distinct sets of access rules. The firewall can also be configured to utilize "stateful" packet filtering which involves caching rule processing results for one or more packets, and then utilizing the cached results to bypass rule processing for subsequent similar packets.

To facilitate passage to a user, by a firewall, of a separate later transmission that is properly in response to an original transmission, a dependency mask can be set based on session data items such as source host address, destination host address, and type of service. The mask can be used to query a cache of active sessions being processed by the firewall, such that a rule can be selected based on the number of sessions that satisfy the query. Dynamic rules may be used in addition to pre-loaded access rules in order to simplify rule processing. To unburden the firewall of application proxies, the firewall can be enabled to redirect a network session to a separate server for processing, the only data packets that are transmitted between source and destination network addresses are those that satisfy the blocking policies stored by the blocking data structure. Thus only, "pre-approved" data can flow through such a control mechanism.

U.S. Pat. No. 6,212,633, issued to Levy, et al. discloses a system in which a distributed firewall is utilized in conjunction with a memory-mapped serial communications interface such as that defined by the IEEE 1394 specification to permit secure data transmission between selected nodes over the interface. The distributed firewall incorporates security managers in the selected nodes that are respectively configured to control access to their associated nodes, thereby restricting access to such nodes to only authorized entities. Furthermore, encrypted transmissions may be supported to restrict unauthorized viewing of data transmitted between the selected nodes over the interface. Implementation of the distributed firewall does not modify any critical specifications for the memory-mapped communications interface that would prevent the selected nodes from residing on the same interface as other nodes that adhere to such specifications but that do not support secure data transmission.

U.S. Pat. No. 5,835,726 issued to Shwed, et al. describes a novel system for controlling the inbound and outbound data packet flow in a computer network. By controlling the packet flow in a computer network, private networks can be secured from outside attacks in addition to controlling the flow of packets from within the private network to the outside world. A user generates a rule base that is then converted into a set of filter language instruction. Each rule in the rule base includes a source, destination, service, whether to accept or reject the packet and whether to log the event. The set of filter language instructions are installed and execute on inspection engines that are placed on computers acting as firewalls. The firewalls are positioned in the computer network such that all traffic to and from the network to be protected is forced to pass through the firewall.

Thus, packets are filtered as they flow into and out of the network in accordance with the rules comprising the rule base. The inspection engine acts as a virtual packet-filtering machine that determines on a packet-by-packet basis whether to reject or accept a packet. If a packet is rejected, it is dropped. If it is accepted, the packet may then be modified. Modification may include encryption, decryption, signature generation, and signature verification or address translation. All modifications are performed in accordance with the contents of the rule base. The present invention provides additional security to a computer network by encrypting communications between two firewalls between a client and a firewall. This permits the use of insecure public networks in constructing a WAN that includes both private and public network segments, thus forming a virtual private network.

U.S. Pat. No. 5,968,176 issued to Nessett, et al. discloses a system that provides for establishing security in a network that include nodes having security functions operating in multiple protocol layers. Multiple network devices, such as remote access equipment, routers, switches, repeaters and network cards having security functions are configured to contribute to implementation of distributed firewall functions in the network. By distributing firewall functionality throughout many layers of the network in a variety of network devices, a pervasive firewall is implemented.

The pervasive, multilayer firewall includes a policy definition component that accepts policy data that defines how the firewall should behave. The policy definition component can be a centralized component, or a component that is distributed over the network. The multilayer firewall also includes a collection of network devices that are used to enforce the defined policy. The security functions operating in this collection of network devices across multiple protocol layers are coordinated by the policy definition component so that particular devices enforce that part of the policy pertinent to their part of the network. While other variations exist, the above-described firewall-based designs for handling unwanted network data transmissions are typical of those encountered in the prior art.

The primary objective of the present invention is to eliminate or minimize the liability associated with "packet flooding attacks" initiated from within a local area network linked to an external network. In these attacks, an attacker tries to use up all the bandwidth to the victim by sending data of little or no value (at least to the victim), thereby making more valuable communication with the victim slow or unreliable. The Reverse Firewall invention uses a variety of techniques to determine maximum acceptable rates for data packet transmissions passing through the non-redundant connection between a local area network and an external network provided by the invention. These techniques relate to methods of classifying data packets arriving at the firewall. One such classification involves determining whether packets arriving at the firewall for transmission to the external network are in response to data packets received at the firewall from the external network.

A secondary objective is to maximize the utilization of data packet handling resources within the local area network. This practice involves identifying those data packets that are requests for service, measuring the amount of service requested by each packet, and determining an appropriate amount of resources to be used to provide the requested services. The invention provides facilities for storing and recalling past measurements of the amounts of service provided for each type of service requested. This allows the invention to appropriately allocate the resources available within the local area network.

SUMMARY OF THE INVENTION

The present invention addresses many of the deficiencies of prior art packet transmission control systems and satisfies all of the objectives described above. A packet transmission control system for managing traffic between at least two data networks, each of the networks including a plurality of host computers, communication lines and transmitted data packets, can be constructed from the following components. At least one firewall is provided. The firewall includes hardware and software providing a non-redundant connection between the networks and serves to control packet transmission between the networks.

Means are provided for classifying data packets received at the firewall related to the consumption of at least one resource. Means are provided for associating a maximum acceptable transmission rate with each class of data packet received at the firewall. Means are provided for limiting the transmission rate from the firewall to the maximum acceptable transmission rate for each class of data packet. When transmission rates from the firewall are so limited, packet flooding and other over usage type distributed denial of service attacks cannot be effectively launched through the non-redundant connection.

In a variant of the invention, data packets within each class are further subclassified by locations within one of the networks from which those data packets originated, or from which they were forwarded to the firewall. Based upon this identification, the firewall will thus limit the transmission rate for data packets of each subclass from locations within one of the networks to provide locations proportionally fair service of forwarding data packets to another of the networks.

In another variant, the firewall maintains a memory of recently forwarded data packets and classifies arriving data packets as either data packets sent from one of the networks in response to at least one of the recently forwarded data packets from another of the networks or data packets not sent in response to any recently forwarded data packets. The firewall will thus limit the transmission rate of data packets that are not sent in response to any recently forwarded data packets.

In still another variant of the invention, the means for classifying data packets received at the firewall further includes identifying data packets as requests for services of at least one type requiring transmission of data packets from locations within one of the networks to another of the networks. Means are provided for firewall to measure the amount of service requested by each identified packet. Based upon this identification and this measure of amount of service, the firewall will thus limit the transmission rate for data packets that are requests for services based upon the type of service requested in order to limit usage of each service.

In yet another variant, the means for classifying data packets received at the firewall further includes identifying data packets as requests for services of at least one type requiring transmission of data packets from locations within one of the networks to another of the networks and identifying data packets as responses to earlier service requests of at least one type from a location within one of the networks requiring transmission of data packets to another of the networks. Means are provided for firewall to measure the amount of service requested by each identified data packet. Based upon this identification and this measure of amount of service, the firewall will thus limit the transmission rate for data packets that are requests for services based upon the type of service requested in order to limit usage of each service.

In a final variant of the invention, the packet transmission control system further includes means for storing and retrieving past measurements of service provided for each type of service. The firewall will limit the transmission rate for data packets that are requests for each type of service to limit usage of each service over extended periods of time.

An appreciation of the other aims and objectives of the present invention and an understanding of it may be achieved by referring to the accompanying drawings and the detailed description of a preferred embodiment.

DETAILED DESCRIPTION OF THE PREFERRED EMBODIMENT

Figure 1:
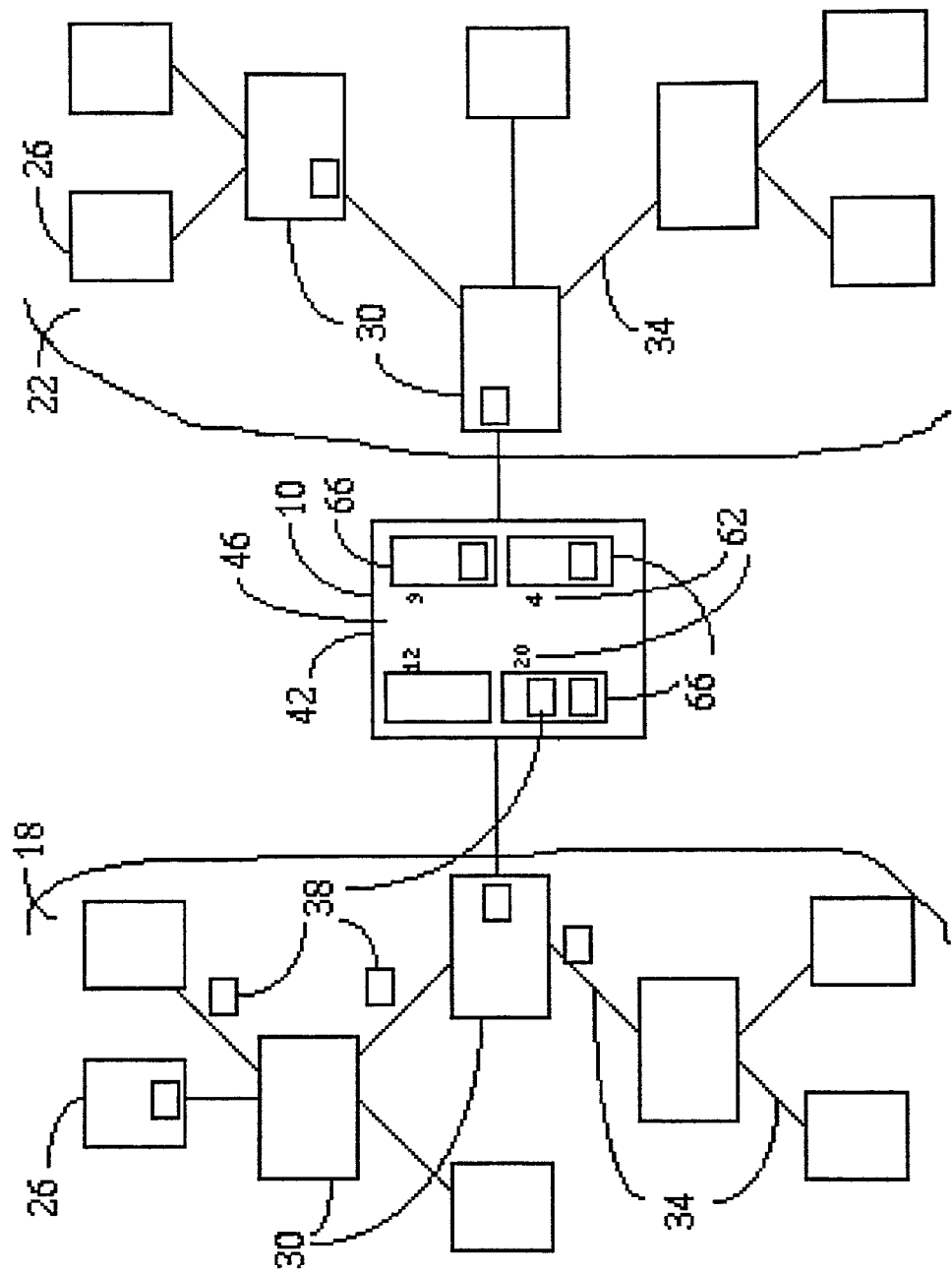
FIG. 1 is a schematic view of a first embodiment of the invention illustrating the association of maximum acceptable transmission rates for each class of data packet received at a firewall providing a non-redundant connection between two data networks.

FIG. 1 illustrates a packet transmission control system 10 for managing traffic 14 between at least two data networks 18, 22, each of the networks 18, 22 including a plurality of host computers 26, communication lines 34 and transmitted data packets 38, can be constructed from the following components. At least one firewall 42 is provided. The firewall 42 includes hardware and software providing a non-redundant connection 46 between the networks 18, 22 and serves to control packet transmission between the networks 18, 22.

Means are provided for classifying data packets 38 received at the firewall 42 related to the consumption of at least one resource. Means are provided for associating a maximum acceptable transmission rate 62 with each class 66 of data packet 38 received at the firewall 42. Means are provided for limiting the transmission rate from the firewall 42 to the maximum acceptable transmission rate 62 for each class 66 of data packet 38. When transmission rates 62 from the firewall 42 are so limited, packet flooding and other over usage type distributed denial of service attacks cannot be effectively launched through the non-redundant connection 46.

Figure 2:
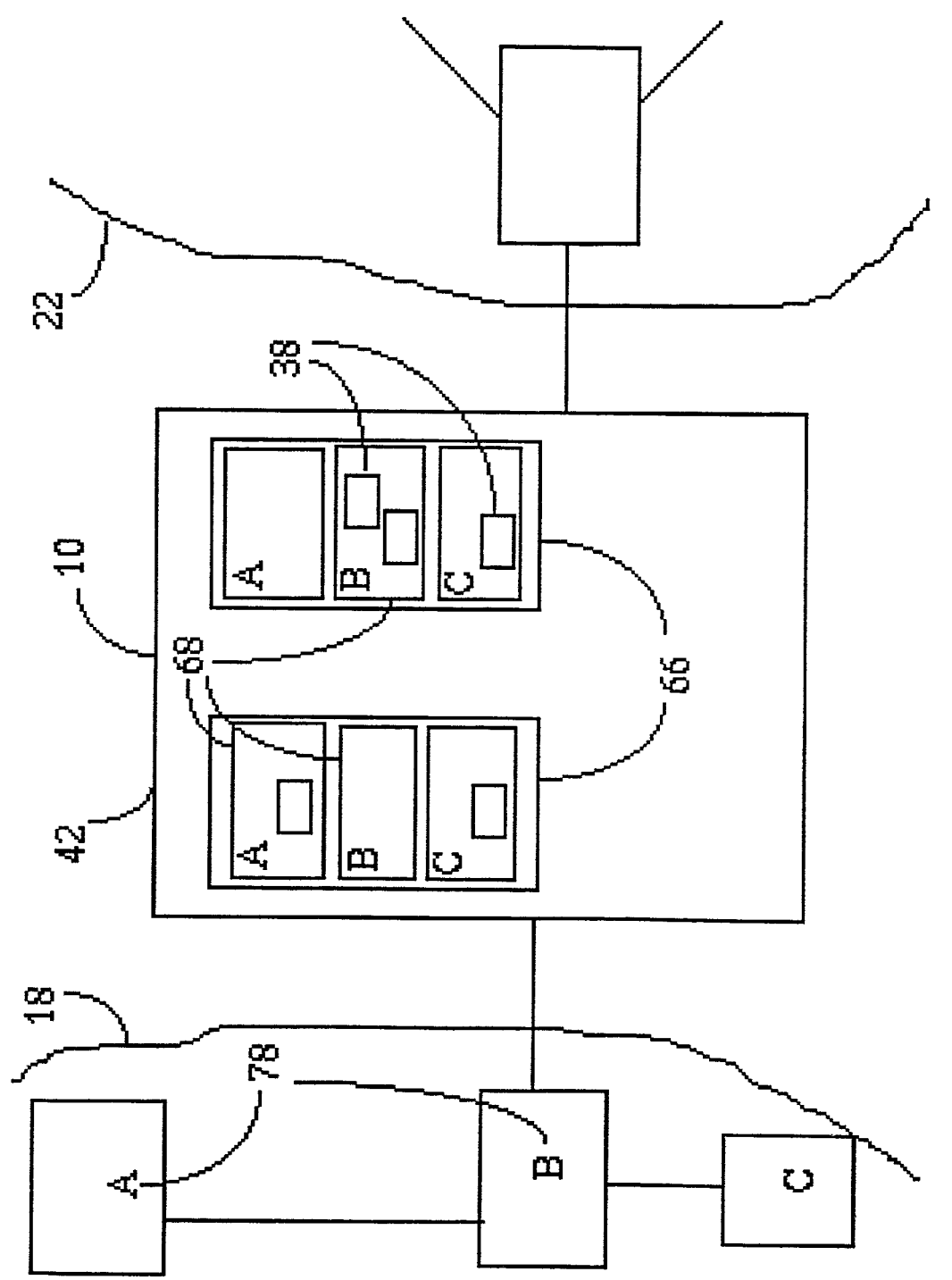
FIG. 2 is a schematic view of a second embodiment illustrating further subclassification of data packets by location within a network from which they originated or were forwarded to the firewall.

In a variant of the invention, as illustrated in FIG. 2, data packets 38 within each class 66 are further subclassified by locations 78 within one of the networks 18 from which those data packets 38 originated, or from which they were forwarded to the firewall 42. Based upon this identification, the firewall 42 will thus limit the transmission rate for data packets 38 of each subclass 68 from locations 78 within one of the networks 18 to provide locations 78 proportionally fair service of forwarding data packets 38 to another of the networks 22.

Figure 3:
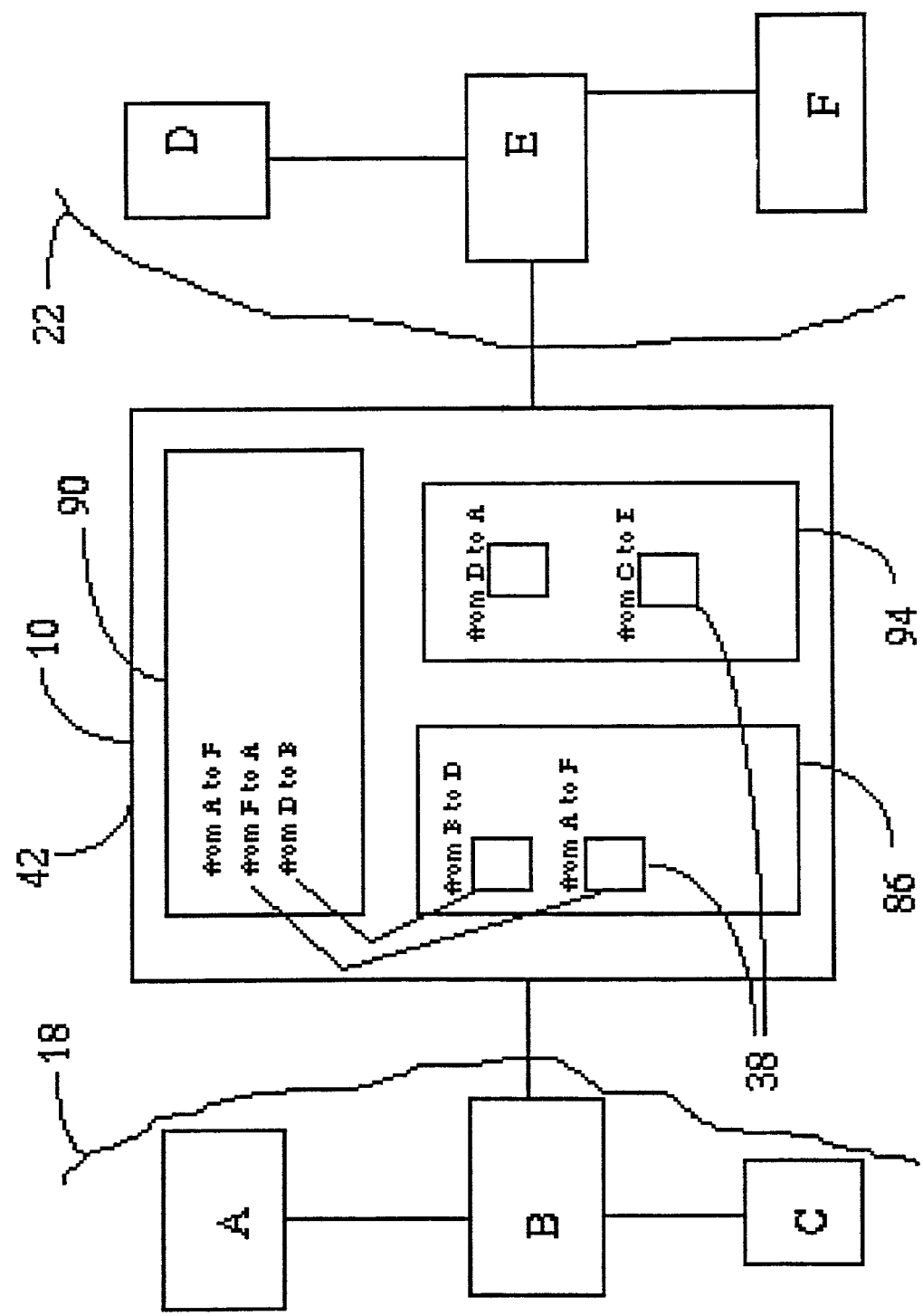
FIG. 3 is a schematic view of a third embodiment illustrating the firewall's memory regarding recently forwarded data packets and their classification as either data packets sent from one of the networks in response to a packet forwarded from another network or data packets not sent in response to any recently forwarded data packet.

In another variant, as illustrated in FIG. 3, the firewall 42 maintains a memory of recently forwarded data packets 90 and classifies arriving data packets 38 as either data packets 86 sent from one of the networks 18 in response to at least one of the recently forwarded data packets 38 from another of the networks 22 or data packets 94 not sent in response to any recently forwarded data packets 38. The firewall 42 will thus limit the transmission rate of data packets 94 that are not sent in response to any recently forwarded data packets 38.

Figure 4:
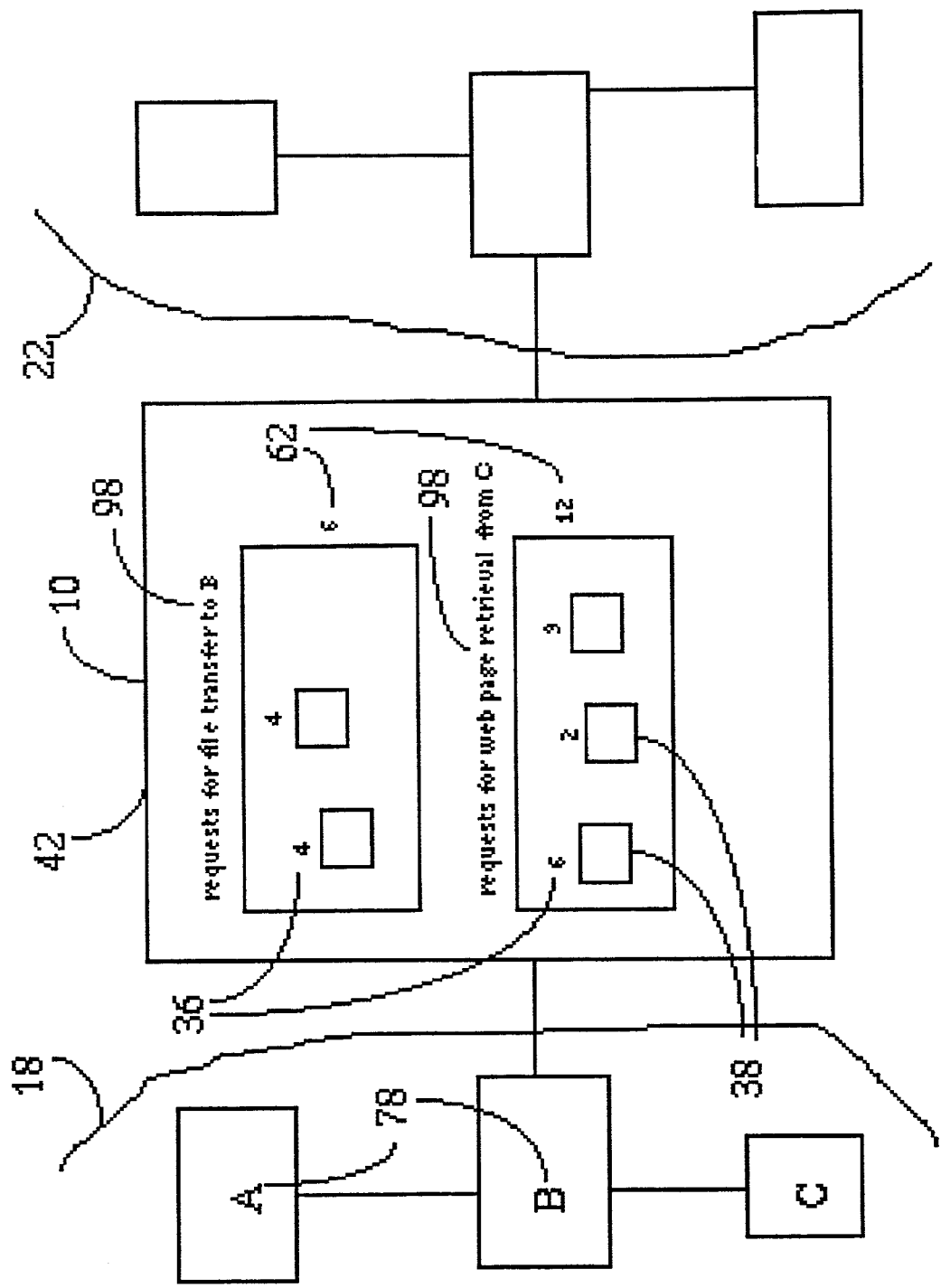
FIG. 4 is a schematic view of a fourth embodiment illustrating means for the firewall to classify data packets as requests for service and means for measuring the amount of service requested by each data packet.

In still another variant of the invention, as illustrated in FIG. 4, the means for classifying data packets 38 received at the firewall 42 further includes identifying data packets 38 as requests for services 98 of at least one type requiring transmission of data packets 38 from locations 78 within one of the networks 18 to another of the networks 22. Means are provided for firewall 42 to measure the amount of service 36 requested by each identified packet 38. Based upon this identification and this measure of amount of service 36, the firewall 42 will thus limit the transmission rate for data packets 38 that are requests for services 98 based upon the type of service 98 requested in order to limit usage of each service 98.

Figure 5:
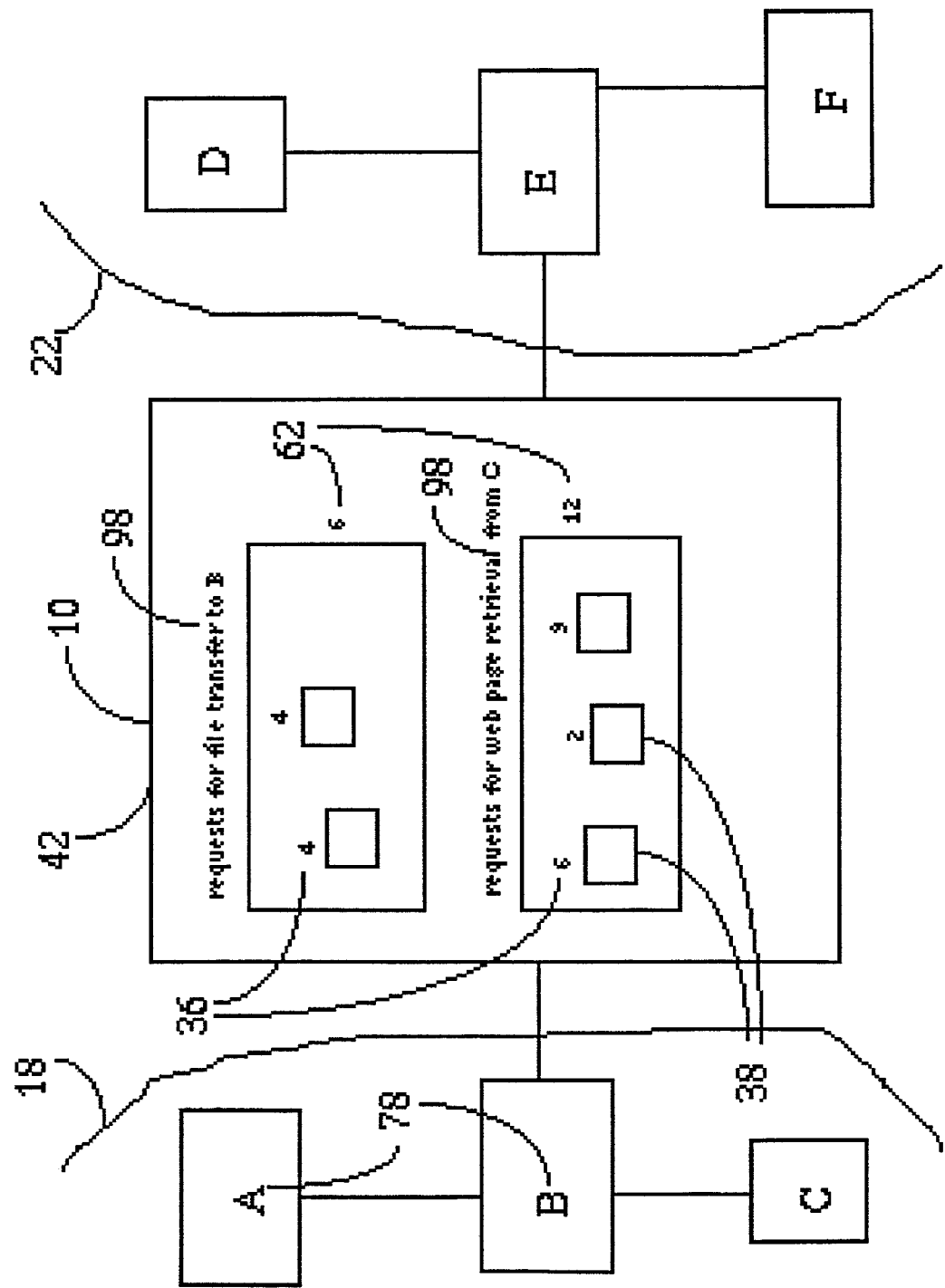
FIG. 5 is a schematic view of a fifth embodiment illustrating means for the firewall to classify data packets as requests for service, identifying data packets as responses to earlier service requests and measuring the amount of service requested by each identified data packet.

In yet another variant, as illustrated in FIG. 5, the means for classifying data packets 38 received at the firewall 42 further includes identifying data packets 38 as requests for services 98 of at least one type requiring transmission of data packets 38 from locations 78 within one of the networks 18 to another of the networks 22 and identifying data packets 38 as responses to earlier service requests 98 of at least one type from a location 78 within one of the networks 18 requiring transmission of data packets 38 to another of the networks 22. Means are provided for firewall 42 to measure the amount of service 36 requested by each identified data packet 38. Based upon this identification and this measure of amount of service 36, the firewall 42 will thus limit the transmission rate for data packets 38 that are requests for services 98 based upon the type of service 98 requested in order to limit usage of each service 98.

Figure 6:
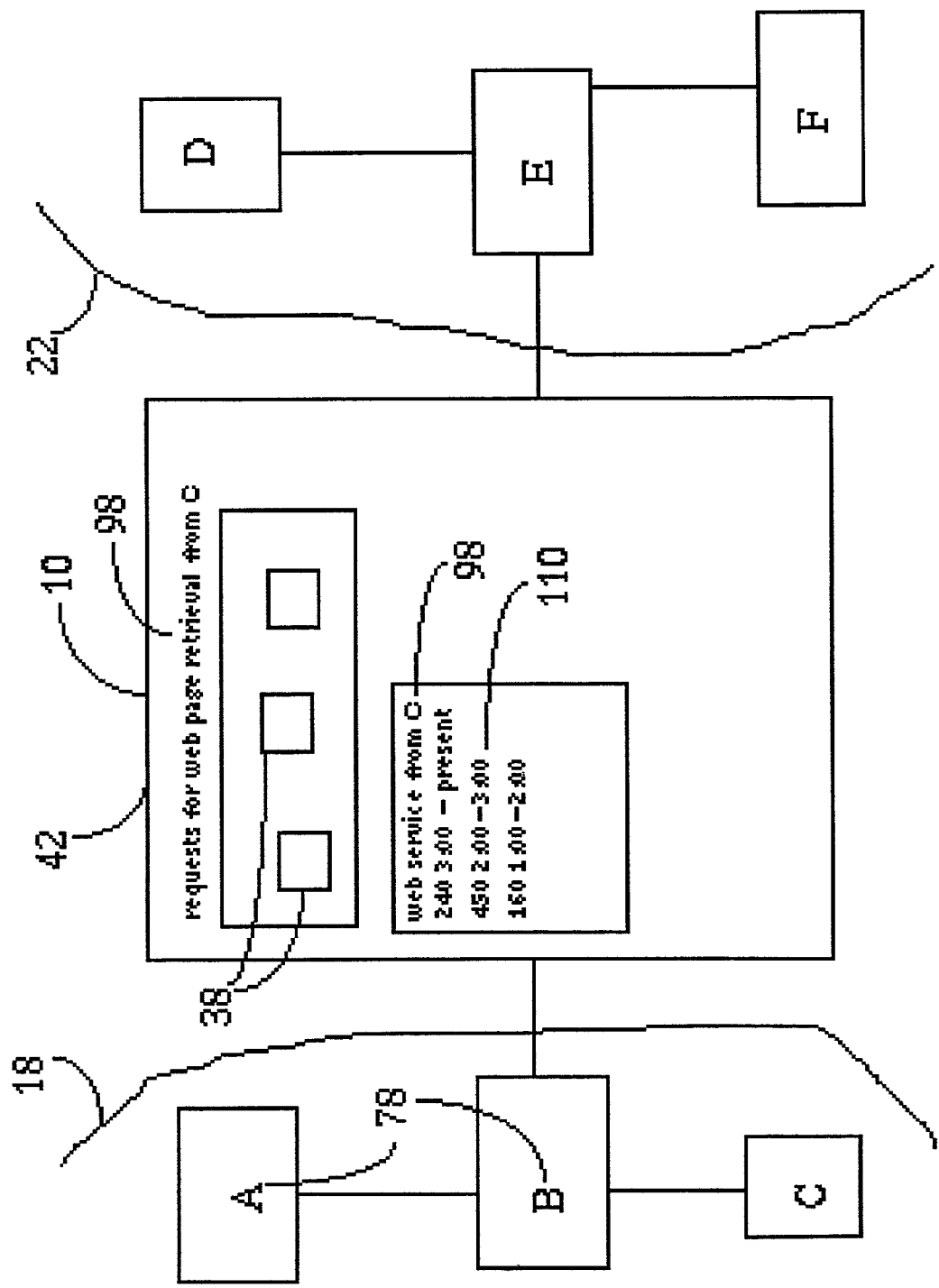
FIG. 6 is a schematic view of a sixth embodiment illustrating means for the firewall to store and retrieve past measurements of service provided for each type of service.

In a final variant of the invention, as illustrated in FIG. 6, the packet transmission control system 10 further includes means for storing and retrieving past measurements 110 of service provided for each type of service 98. The firewall 42 will limit the transmission rate for data packets 38 that are requests for each type of service 98 to limit usage of each service over extended periods of time.

The packet transmission control system 10 has been described with reference to particular embodiments. Other modifications and enhancements can be made without departing from the spirit and scope of the claims that follow.

The invention claimed is:

1. A packet transmission control system for managing traffic between at least two data networks, each of said networks comprising a plurality of host computers, communication lines and transmitted data packets, said system comprising:

at least one firewall, said firewall comprising:
hardware and software providing a non-redundant connection between said networks and serving to control packet transmission between said networks;
means for classifying data packets received at said firewall related to the consumption of at least one resource;
means for associating a maximum acceptable transmission rate with each class of data packet received at said firewall;
means for limiting the transmission rate from the firewall to the maximum acceptable transmission rate for each class of data packet; and
whereby, packet flooding and other over usage type distributed denial of service attacks cannot be effectively launched through said non-redundant connection.

2. A packet transmission control system, as described in claim 1 wherein the means for classifying data packets received at the firewall further comprises:
identifying data packets as either of originating from locations within one of said networks for transmission to another of said networks and forwarded by locations within one of said networks for transmission to another of said networks; and
whereby, said firewall will limit the transmission rate for data packets of each class from locations within one of said networks to provide proportionally fair forwarding service to other locations within said network that communicates through said non-redundant connection.

3. A packet transmission control system, as described in claim 1 wherein the means for classifying data packets received at the firewall further comprises:
identifying data packets as either of data packets sent from one of said networks in response to identified data packets received from another of said networks and data packets not sent in response to said identified data packets; and whereby, said firewall will limit the transmission rate for data packets transmitted from locations within one of said networks to another of said networks that are not sent in response to identified data packets received at the firewall from said other network.

4. A packet transmission control system, as described in claim 1 wherein the means for classifying data packets received at the firewall further comprises:

identifying data packets as requests for services of at least one type requiring transmission of data packets from locations within one of said networks to another of said networks;

means for said firewall to measure the amount of service requested by each packet; and whereby, said firewall will limit the transmission rate for data packets that are requests for services based upon the amount of service requested by those packets in order to limit the rate of usage of each type of service.

5. A packet transmission control system, as described in claim 1 wherein the means for classifying data packets received at the firewall further comprises:

identifying data packets as responses to earlier service requests of at least one type from a location within one of said networks requiring transmission of data packets to another of said networks;

means for said firewall to measure the amount of service consumed in order to send each identified response data packet; and whereby, said firewall will limit the transmission rate for data packets that are requests for services of each type based upon the amount of service delivered in response to previous requests.

6. A packet transmission control system, as described in claim 1, further comprising:

means for storing and recalling past measurements of amounts of service provided for each type of service; and whereby, said firewall will limit the transmission rate for data packets that are requests for each type of service to limit usage of each service over extended periods of time.

* * * * *